Figure 1:
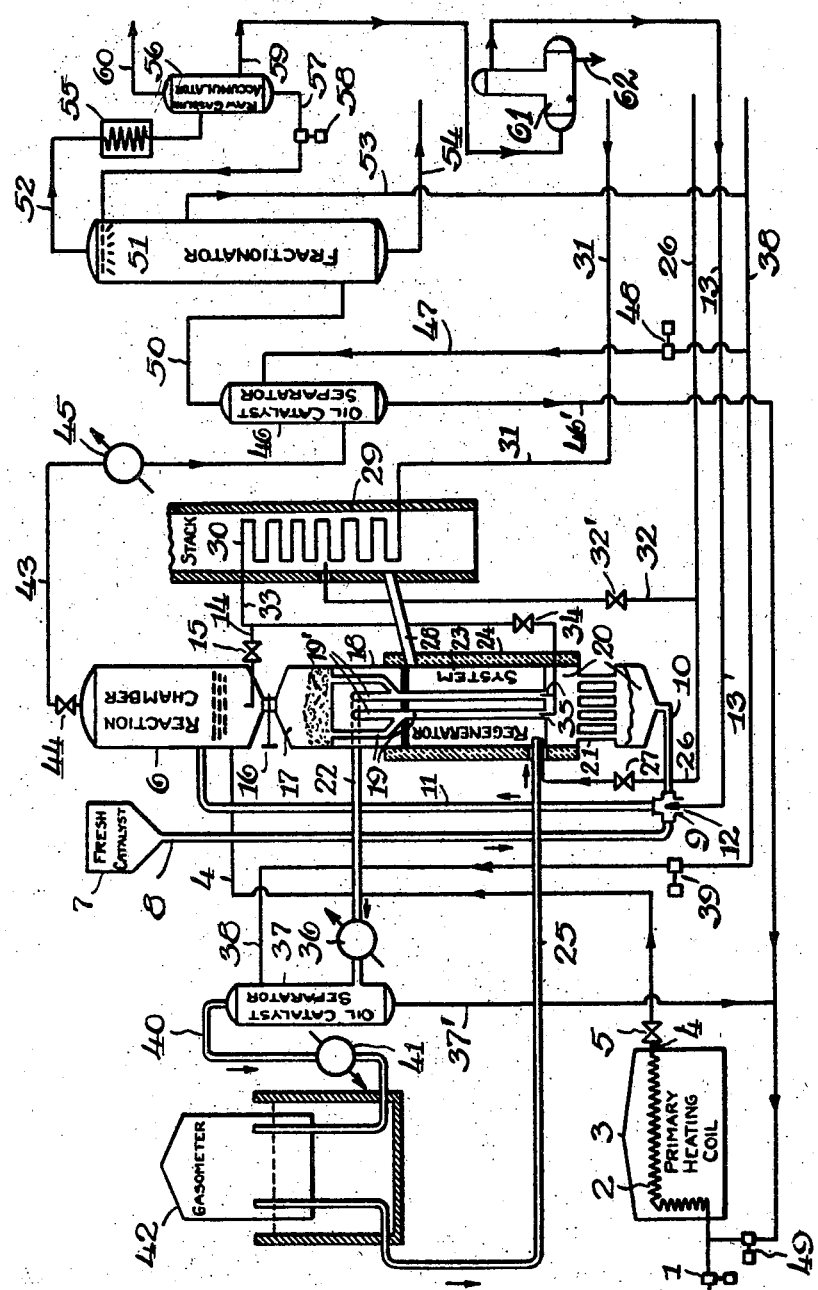

Feb. 24, 1948.            A. D. SMITH           2,436,495
PROCESS AND APPARATUS FOR ADSORPTIVELY AND
CATALYTICALLY TREATING HYDROCARBON OIL
Filed Dec. 26, 1945        3 Sheets-Sheet 3

INVENTOR.

Patented Feb. 24, 1948

2,436,495

UNITED STATES PATENT OFFICE 2,436,495

PROCESS AND APPARATUS FOR ADSORPTIVELY AND CATALYTICALLY TREATING HYDROCARBON OIL

Arthur D. Smith, Park Ridge, Ill., assignor to Adsorptive Process Company, Chicago, Ill., a corporation of Nevada Application December 26, 1945, Serial No. 637,186

7 Claims. (Cl. 196—52)

The invention relates to an improvement in process and apparatus for adsorptively and catalytically treating hydrocarbon oil in the presence of a dispersed catalyst, and more particularly to a process and apparatus for adsorptively and catalytically treating petroleum hydrocarbon oil of relatively low octane rating, while essentially in vapor phase and under transforming conditions of heat and pressure, with a divided dispersed mineral catalyst; production of high anti-knock gasoline and regeneration of catalyst under exclusion of free oxygen being important objectives.

A known process for producing gasoline of high octane rating comprises contacting a hydrocarbon oil, while under transforming conditions of heat and pressure, with a dispersed divided catalyst and separating spent catalyst from accompanying residual oil by hot filtration; while another known catalytic process for producing gasoline of high octane rating from hydrocarbon oil comprises somewhat similar initial treatment as above described, with regeneration of spent catalyst effected by burning off carbon adsorbed by the catalyst in the process, in a free oxygen-containing atmosphere.

The first mentioned process requires a relatively costly filtration system which still leaves the catalyst with all of its adsorbed carbon and so much associated oil that it cannot be returned to the system without further treatment; while the second mentioned method involves so much danger of overheating the catalyst during its regeneration, with attendant loss of catalytic power, that special indirect cooling means have to be installed to control the exothermic reaction incident to burning off the adsorbed carbon.

The present invention is an improvement over the foregoing in that the catalyst is not only returned to the system ready for use, but since its regeneration is conducted in an atmosphere devoid of free oxygen and in a readily controlled endothermic reaction, the danger of overheating the catalyst and destroying its efficiency incident to exothermic burning does not arise.

Another advantage of the present invention includes the transformation of a very substantial part of the carbon adsorbed by the catalyst into gases having an excellent fuel value, i. e., methane and carbon monoxide.

A further advantage of the present invention is, that coincident with the formation of methane and carbon monoxide during regeneration of the catalyst, there is also produced a substantial quantity of free hydrogen and minor quantities of alkanes and alkenes of the $C_2$, $C_3$ and $C_4$ series, the hydrogen component materially adding to the fuel value of the composite gas as a whole, and further to its potential value as a hydrogenating agent if it be desired to return same to the process. A typical analysis of such gas where regeneration of spent catalyst is effected at a moderately high temperature would be, in respect to its main constituents, methane 32%, carbon monoxide 12%, carbon dioxide 11% and hydrogen 35%. The carbon monoxide content of such gas may be catalyzed over iron oxide to carbon dioxide, the latter absorbed by an alkaline base such as slaked lime, and the remaining gas, now substantially methane and hydrogen, introduced to the reaction zone for admixture with the hydrocarbon vapor to be processed; or the above mentioned composite gas may be returned to the system for processing with or without removal of its initial carbon dioxide constituent. Such gas may be also employed as fuel in the manner subsequently to be described.

In carrying out the process, I preferably employ as charging stock a petroleum hydrocarbon such as gas oil, kerosene distillate, naphtha or a mixture of two or more of such products; in short, so-called clean stock, although heavier oils can be used, but with reduced yield of high octane gasoline. The charging stock is continuously fed to a conventional preheating coil and the effluent therefrom, in a vaporized or substantially vaporized condition, and under transforming conditions of heat and pressure, is conducted to a reaction zone where it is continuously contacted with a suitable divided catalyst in dispersed phase. The spent catalyst from such operation, after the greater portion of its adsorbed and associated heavy hydrocarbon is stripped by steam, drops into the charge hopper of a regeneration zone, the latter comprising a plurality of tubes or channels connecting the charge hopper with a discharge hopper. The longer lower portions of the tubes extend in vertical disposition through a heat resistant and refractory lined combustion chamber which is provided near the bottom with conventional gas and oil burners, and near the top with a breeching for conducting the products of combustion to a stack. In the latter, though not limited to such location, is conveniently disposed a steam superheating coil in the path of the combustion gases. Such coil may be further heated, as required, by additionally supplied fuel.

The combustion chamber serves as an auxiliary means for externally heating the tubular system through which the spent catalyst descends in its process of regeneration, the fuel being preferably the before mentioned composite combustible gas, supplemented, if necessary, by extraneously supplied fuel. The primary source of heat imparted to the spent catalyst is, however, through the agency of superheated steam injected into the lower portion of each tubular unit and supplied from the above mentioned steam superheating coil.

The temperature of the superheated steam, the ratio of the latter to catalyst, and the degree of heat maintained in the combustion chamber is so adjusted that the catalyst is heated in the tubular elements under exclusion of free oxygen between approximately 900° F. and 1300° F.; or at such temperature as to effect, without impairment of the activity of the catalyst, a chemical reaction between the steam and the adsorbed carbon on the catalyst particles, thus resulting in the regeneration of the catalyst and production of the above mentioned composite combustible gas; more carbon monoxide and less carbon dioxide being produced at the higher temperature ranges, with the converse obtaining at the lower ranges.

Such composite gas, together with any excess steam and entrained catalyst particles, is trapped off under a less head pressure than obtains in the upper part of the main tubular sections through suitable lateral extensions which are manifolded to a main gas line. The gas after passing through a heat exchanger, where it is reduced to a less than cracking temperature, enters an oil-catalyst separator where any entrained catalyst is removed. After further cooling to condense any free steam, the gas finally enters a gasometer from whence it is supplied as fuel to the combustion chamber in the manner aforesaid.

The main body of the regenerated catalyst, together with whatever amount of fresh catalyst is required to replace loss, is continuously introduced into the reaction chamber in a stream of fluid hydrocarbon supplied through a suitable jet means. Although not so limited, such fluid hydrocarbon may advantageously be a by-product gas of the process, for example, gas from a stabilizer in which raw gasoline produced by the process is depropanized; such gas being commonly a mixture of alkanes and alkenes of low molecular weight.

The catalyst may be any of the natural adsorptive catalysts such as activated clays, or treated bentonite; or synthetic aluminum silicates; and more broadly any suitable catalyst that may be handled and regenerated in the manner previously described; the specific catalyst employed not being claimed as a part of the invention.

The transformed vapor from the reaction zone, after first passing through a heat exchanger where its temperature is somewhat reduced, is stripped of entrained catalyst particles in an oil-catalyst separator and then passes to a fractionator from which raw gasoline vapor is released to a condenser, light gas oil or recycle stock is discharged as a side stream and heavier oil is withdrawn from the bottom as a residual product.

The light gas oil may be recycled in its entirety direct to the process as a part of the charging stock, but I prefer to first employ a portion of the former as a wash oil in the before mentioned oil catalyst separators, returning the oil-catalyst slurries so obtained to the system as a part of the charging stock and thus reducing catalyst loss to a minimum.

The raw gasoline flowing from the condenser passes to an accumulator from which a small portion is returned to the fractionator as trim stock, the balance being conducted to a stabilizer where it is depropanized according to standard practice. Uncondensed vapor from the raw gasoline accumulator is preferably subjected to one of the known polymerization processes.

Figure 2:
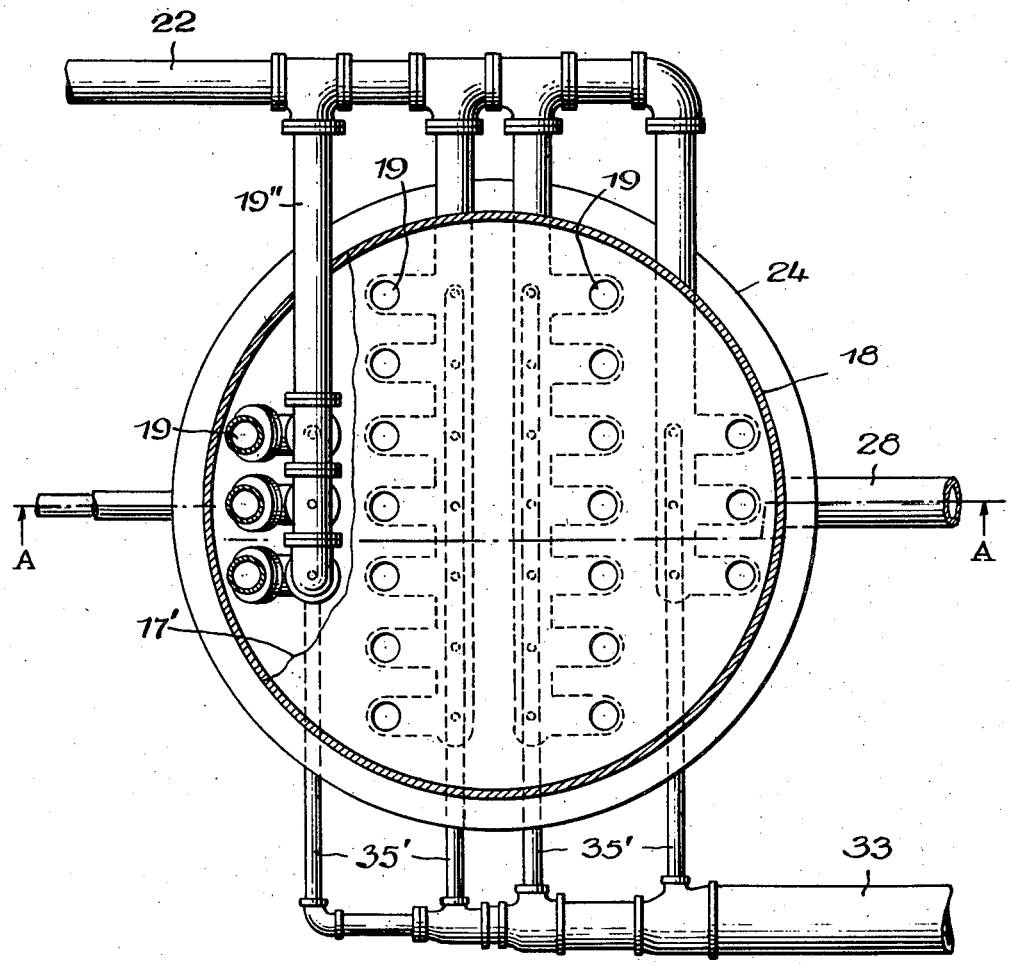
Figure 3:
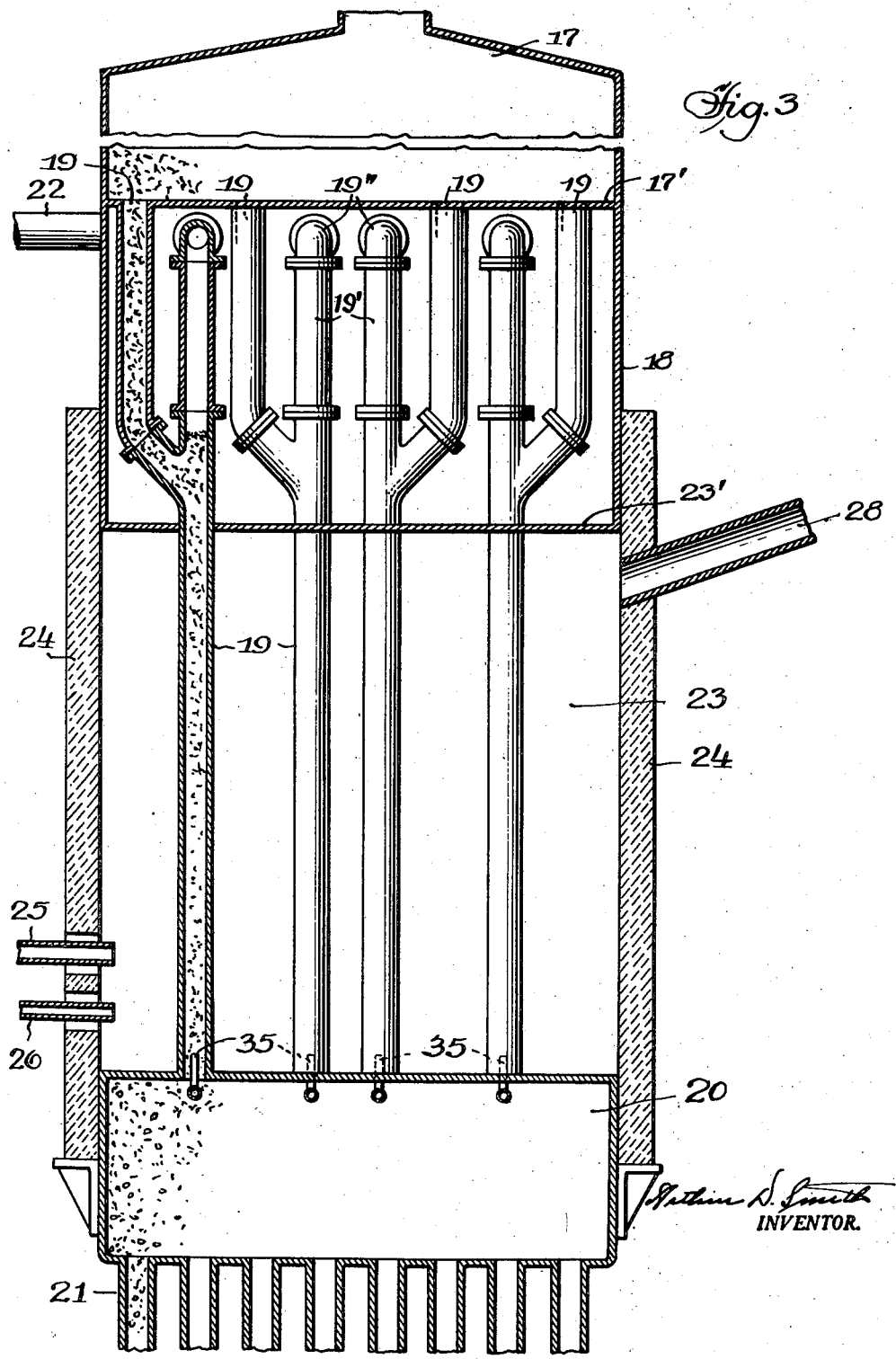

In order that the invention may be more clearly understood, reference is made to the accompanying drawings, where Fig. 1 denotes a flow diagram of the process, while Figs. 2 and 3 respectively represent horizontal and vertical cross sectional views of one form of apparatus for regeneration of catalyst as comprehended by the invention; like parts being numbered the same in each drawing.

Referring to Fig. 1, the pressure pump 1 continuously delivers charging stock to the heating coil 2 disposed in the furnace 3, which is heated by any convenient source of fuel. The coil effluent, in a vaporized or substantially vaporized state and obtaining at a transforming temperature, flows through the line 4, as controlled by the pressure release valve 5, to the reaction chamber 6, where under a pressure which will commonly lie between 75 and 1000 lbs., depending on the composition of the charging stock and catalyst employed, it commingles with the latter in dispersed phase.

Fresh catalyst, in a state of subdivision that can be readily propelled and dispersed in a current of fluid carrier hydrocarbon such as any of the $C_1$–$C_3$ alkanes or alkenes, or a mixture thereof, flows downward from the bin 7 through the line 8 to the manifold 9, from whence, admixed with hot regenerated catalyst supplied to the said manifold through the line 10 (after the process is in regular operation), it is injected to the reaction chamber in a current of the said carrier hydrocarbon through the line 11 by the agency of the jet 12. The carrier hydrocarbon supplied through the line 13 and delivered under a sufficient pressure to operate the jet 12, may conveniently be as previously stated, hydrocarbon gas derived from stabilization of the gasoline produced by the process.

The temperature of the effluent from coil 2 and its degree of completeness of vaporization will be governed to a considerable extent by the type, quantity and temperature of the regenerated catalyst, the coil outlet temperature being so adjusted in relation to the factors immediately above mentioned, that the transforming reaction in the reaction chamber 6 occurs essentially in vapor phase. The exact temperature maintained in the reaction chamber will depend on the nature of the charging stock, type of catalyst, its quantitative ratio to the oil processed and whether a moderate yield of exceptionally high octane gasoline, or a maximum return of moderately high octane gasoline is the objective; so that no hard and fast figure can be given, although the operative temperature in the reaction chamber will usually lie between 750° F. and 1200° F.

Spent catalyst is stripped from adsorbed and/or associated heavy hydrocarbon formed during the transforming reaction by a stream of superheated steam supplied through the line 14, as governed by valve 15. It then discharges from the reaction chamber 6, as controlled by valve 16, to the charge hopper 17 of the regenerator 18, and thence descends through a plurality of tubes or channels 19 fabricated of heat resistant alloy, to the discharge hopper 20, which is provided with cooling tubes 21. The upper sections of the tubes or channels 19 terminate in Y-bends with the lateral or longer branches thereof respectively connecting to the charge hopper and the shorter vertically disposed branches 19' to manifolds 19" which in turn connect to the gas main 22. The longer lower sections of the tubes or channels 19 extend in vertical disposition through the combustion chamber 23 which is encased by a refractory wall 24; the shell of the regenerator system being partially cut away in the drawing to show the above mentioned parts.

The combustion chamber is heated primarily by the before mentioned composite combustible gas as supplied through line 25, and is further equipped with an auxiliary fuel supply (gas or oil) delivered through line 26, as controlled by valve 27; the products of combustion escaping through the breeching 28 to the stack 29. In the latter, and installed in the path of the hot combustion gases, is disposed the steam superheating coil 30 supplied by steam from any suitable source through the line 31; an auxiliary fuel supply (gas or oil) for heating the coil and supplied through lines 26 and 32, as controlled by valve 32', ensuring attainment of the necessary degree of superheat by the steam.

The thus superheated steam, obtaining approximately at a temperature between 900° F. and 1300° F. and under the requisite system pressure, is delivered through the line 33, as controlled by valve 34, to the multiple jets 35 which release the steam upward through the plurality of tubes 19 in countercurrent to the descending hot spent catalyst, which may be further externally heated, as required, by the means previously discussed. The steam in its upward passage chemically combines with the carbon adsorbed by the catalyst during the transforming reaction, according to the general equations

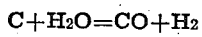

$$C + H_2O = CO + H_2$$

and

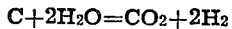

$$C + 2H_2O = CO_2 + 2H_2$$

thus forming the before described combustible gas and regenerating the catalyst. Since the latter in its descent through the tubes 19 does not back up appreciably in the extensions 19', the difference in head pressure prevents the gas produced from entering the charge hopper 17, it therefore flowing through the said extensions to the gas main 22.

The operation of the regenerative process can be followed in greater detail in Figs. 2 and 3, which respectively depict a horizontal cross sectional view through the charge hopper of the regenerator looking downward, and a vertical cross sectional view through the regenerator along the line A—A.

Referring specifically to Fig. 2, the upper openings of twenty tubes or channels 19 are shown as better illustrating the concept of a plurality, it being understood any convenient number may be employed in actual practice, such tubes being preferably welded to the bottom sheet 17' of the reaction chamber. Through the broken section of such sheet appear the manifolds 19" connecting the several extension tubes 19' with the gas main 22; the superheated steam line 33, supplying the jets 35 through branches 35', being shown in decreasing size from point of supply.

Referring specifically to Fig. 3, it will be noted the upper portion of the tubes 19, the extension tubes 19' and manifolds 19" are protected from the flame of the combustion chamber 23 by the crown sheet 23', this to avoid undue overheating of the gas system. The probable level of the catalyst in the several extension tubes 19' is shown in one tube only, the remainder of the construction being self-explanatory from the preceding description.

Returning to a further description of the process with reference to Fig. 1, the gas flowing through the main 22 passes through the heat exchanger 36 wherein its temperature is reduced to slightly below an oil cracking temperature. The gas next enters the oil catalyst separator 37 where any entrained catalyst particles are removed in a stream of wash oil, conveniently gas oil, or recycle oil produced by the process and fed to the separator by line 38, as controlled by pump 39. The thus cleansed gas leaves the separator 37 by the line 40, and after passing through the exchanger 41 where any steam content is precipitated as water, finally enters the gasometer 42, from whence it is supplied as fuel to the combustion chamber 23 through the line 25 in the manner previously described.

Transformed vapor released from the reaction chamber 6 through the line 43, as controlled by valve 44, after passing through the heat exchanger 45, enters the second oil catalyst separator 46 where any entrained catalyst particles are removed in a stream of the same wash oil as supplied separator 37; such oil being fed through line 47, as controlled by pump 48. The catalyst particles removed in separators 37 and 46 are respectively withdrawn therefrom through lines 37' and 46' as an oil-catalyst slurry, such slurry being introduced to coil 2 by pump 49 to form a portion of the charging stock; the amount of catalyst passing through coil 2 and thence to the reaction chamber being a relatively small portion of the total.

The transformed vapor, freed from catalyst in the separator 46, flows through the line 50 to the fractionator 51, from which raw gasoline vapor, light gas oil or recycle stock, and residual oil are respectively withdrawn through lines 52, 53 and 54. Raw gasoline, condensed in condenser 55, flows to the accumulator 56, from which a portion is returned to the fractionator as trim stock through line 57 and pump 58; the balance flowing through line 59 to a stabilizer 61; and for treatment according to standard practice, stabilized gasoline being withdrawn from the system through line 62 and uncondensed alkane and alkene vapors of low molecular weight returned through line 13. Uncondensed vapor, released from the system through line 60, is preferably treated by some known polymerization process.

The process is not limited to the exact pressures, temperatures and quantities herein described, nor to the means depicted, which represents but one form only of a portion of apparatus suitable for carrying out the invention.

What I claim as new and desire to protect by Letters Patent is:

1. In a catalytic oil conversion apparatus comprising a preheating coil with charging means thereto and an effluent line therefrom connecting to a conversion drum; a fresh catalyst supply line leading to a fluid actuated eductive means adapted to inject catalyst particles to said conversion drum, a vapor line leading from said drum to an oil-catalyst separator, means for feeding wash oil to said separator and means for introducing resultant oil-catalyst slurry withdrawn from said separator to said preheating coil, a vapor line leading from said separator to a fractionator and a recycle oil line leading from said fractionator to the means feeding wash oil to said separator, a vapor line leading from said fractionator to a condenser and a flow line leading from said condenser to an accumulator, a flow line leading from said accumulator to a stabilizer and a vapor line leading from said stabilizer for supplying a fluid actuating medium to said eductive means, a valve controlled spent catalyst discharge line leading from said conversion drum to a catalyst regenerator, said regenerator comprising a charge hopper and a discharge hopper connected by a plurality of tubular means whose longer lower sections extend through a combustion chamber in vertical disposition and whose upper sections terminate in Y bends having lateral or longer branches respectively connecting to said charge hopper and shorter vertically disposed branches to manifolds which in turn connect to a gas main, a gasometer receiving said main and a return gas line from said gasometer to said combustion chamber, a breeching leading from said combustion chamber to a stack, a superheating steam coil disposed in said stack and terminating in a plurality of jet means adapted to introduce superheated steam into each lower section of said plurality of tubular means, auxiliary heating means for said combustion chamber and said steam superheating coil, and a regenerated catalyst line leading from the discharge hopper of said catalyst regenerator to said eductive means.

2. In a catalytic oil conversion apparatus comprising a preheating coil with charging means thereto, an effluent line therefrom connecting to a conversion drum, and a fresh catalyst supply line leading to a fluid actuated eductive means adapted to inject catalyst particles to said conversion drum: a spent catalyst discharge line leading from said conversion drum to a catalyst regenerator, said regenerator comprising a charge hopper and a discharge hopper connected by a plurality of tubular means whose longer lower sections extend through a combustion chamber in vertical disposition and whose upper sections terminate in Y bends having lateral or longer branches respectively connecting to said charge hopper and shorter vertically disposed branches to manifolds which in turn connect to a gas main, a fuel supply line to said combustion chamber, a superheating steam coil terminating in jet means adapted to introduce superheated steam into each lower section of said plurality of tubular means, and a regenerated catalyst line leading from the discharge hopper of said catalyst regenerator to said eductive means.

3. In a cyclic process for the catalytic conversion of hydrocarbons wherein a fluid hydrocarbon obtaining at a transforming temperature is contacted in a conversion zone with dispersed catalyst particles with attendant conversion of a portion of said fluid hydrocarbon into gasoline and another portion into carbon and wherein the catalyst particles become spent through adsorption of said carbon: the steps of discharging the spent catalyst particles from said conversion zone to a multi-chambered regeneration zone disposed in a combustion zone; flowing said spent catalyst particles through the regeneration zone under exclusion of free oxygen in countercurrent to steam superheated to such temperature that metathesis occurs between said carbon and said steam and producing thereby regenerated catalyst particles and a combustible gas comprising carbon monoxide and hydrogen; conducting said gas to and effecting combustion thereof in said combustion zone; respectively employing heat so generated to externally heat said regeneration zone and the hot products of such combustion to superheat said steam; and dispersing said regenerated catalyst particles in a stream of fluid hydrocarbon with introduction thereof to said conversion zone under the conditions aforesaid.

4. In a process for the conversion of hydrocarbons wherein a fluid hydrocarbon obtaining under transforming conditions of heat and pressure is contacted with dispersed catalyst particles in a conversion zone and wherein such particles become spent through adsorption of carbon: the process of removing such adsorbed carbon and thus regenerating the catalyst, effected by flowing the spent catalyst particles from said conversion zone through a multi-channelled regeneration zone disposed in a combustion zone; conducting such flow of catalyst particles through said regeneration zone under exclusion of free oxygen in countercurrent to steam superheated to such degree that metathesis occurs between said adsorbed carbon and said steam and producing thereby regenerated catalyst particles and a composite gas comprising carbon monoxide, carbon dioxide and hydrogen; conducting said composite gas to and effecting combustion thereof in said combustion zone, employing a portion of the heat so generated to externally heat said regeneration zone and another portion to superheat said steam.

5. In a process for the conversion of hydrocarbons wherein a fluid hydrocarbon obtaining under transforming conditions of heat and pressure is contacted with dispersed catalyst particles in a conversion zone and wherein such particles become spent through adsorption of carbon: the process of removing such adsorbed carbon and thus regenerating the catalyst, effected by flowing the spent catalyst particles from said conversion zone through a plurality of parallelly arranged regeneration zones disposed in a combustion zone; conducting such flow of catalyst particles through said regeneration zones under exclusion of free oxygen in countercurrent to steam superheated to approximately between 900° F. and 1300° F. and producing thereby regenerated catalyst particles and a composite gas comprising carbon monoxide, carbon dioxide and hydrogen; conducting said composite gas to and effecting combustion thereof in said combustion zone; employing a major portion of the heat so generated in externally maintaining said generation zone approximately between 900° F. and 1300° F., and a minor portion to superheat said steam.

6. In a process for the conversion of hydrocarbons wherein a fluid hydrocarbon obtaining under transforming conditions of heat and pressure is contacted with dispersed catalyst particles in a conversion zone and wherein such particles become spent through adsorption of carbon: the process of removing such adsorbed carbon and thus regenerating the catalyst, effected by flowing the spent catalyst particles from said conversion zone to a plurality of parallelly arranged regeneration zones disposed in a combustion zone; endothermically reacting said spent catalyst particles in said regeneration zones with a predetermined quantity of steam superheated to such degree that, without impairing the activity of the catalyst, combination occurs between said adsorbed carbon and the oxygen of said steam; producing thereby regenerated catalyst particles freed from carbon and a composite gas comprising carbon monoxide, carbon dioxide and hydrogen; conducting said composite gas from said regeneration zones to and effecting combustion thereof in said combustion zone; and employing a portion of the heat so generated in externally maintaining said regeneration zones at the temperature of said superheated steam.

7. In a cyclic process for the conversion of hydrocarbons wherein a fluid hydrocarbon obtaining under transforming conditions of heat and pressure is contacted with dispersed catalyst particles in a reaction zone and wherein such particles become spent through adsorption of carbon, the method of removing such adsorbed carbon and thus regenerating the catalyst, comprising the continuous steps of: flowing the spent catalyst particles from said conversion zone through inclined connecting zones to a plurality of vertically arranged regeneration zones disposed in a combustion zone; conducting such flow of spent catalyst particles through said regeneration zones in countercurrent to superheated steam obtaining at a temperature causing metathesis to occur with said carbon and producing thereby regenerated catalyst particles and a composite combustible gas comprising carbon monoxide, carbon dioxide and hydrogen; maintaining said flow of spent catalyst particles under a head pressure preventing passage of said steam and said combustible gas through said connecting zones, but allowing passage thereof through said regeneration zones; respectively withdrawing said regenerated catalyst particles from the bottom and said combustible gas from the top of said regeneration zones; conducting said combustible gas to and effecting combustion thereof in said combustion chamber; and employing a portion of the heat so generated in externally maintaining said regeneration zones at a temperature ensuring said metathesis.

ARTHUR D. SMITH.

REFERENCES CITED

The following references are of record in the file of this patent:

UNITED STATES PATENTS

| Number | Name | Date |
|---|---|---|
| 2,261,151 | Fast | Nov. 4, 1941 |
| 2,284,603 | Belchetz et al. | May 26, 1942 |
| 2,312,006 | Thiele | Feb. 23, 1943 |
| 2,328,325 | Butikofer | Aug. 31, 1943 |
| 2,345,487 | Liedholm | Mar. 28, 1944 |
| 2,360,787 | Murphree et al. | Oct. 17, 1944 |
| 2,408,600 | Berg | Oct. 1, 1946 |